June 10, 1941.   P. D. ZOTTU   2,245,138
WAVE METER
Filed Jan. 21, 1937
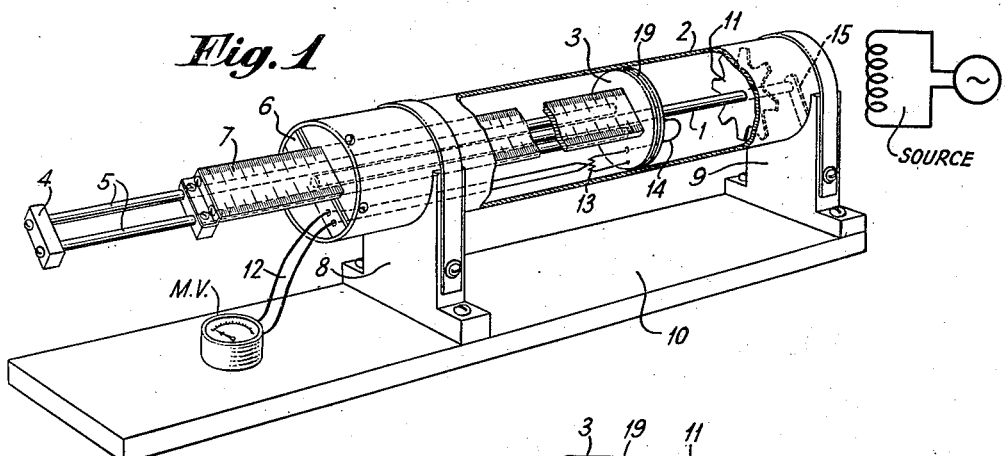
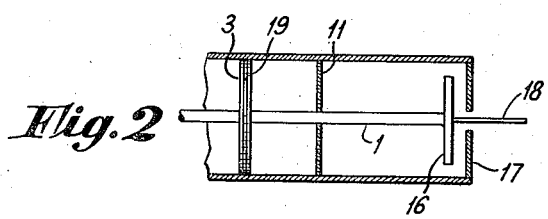
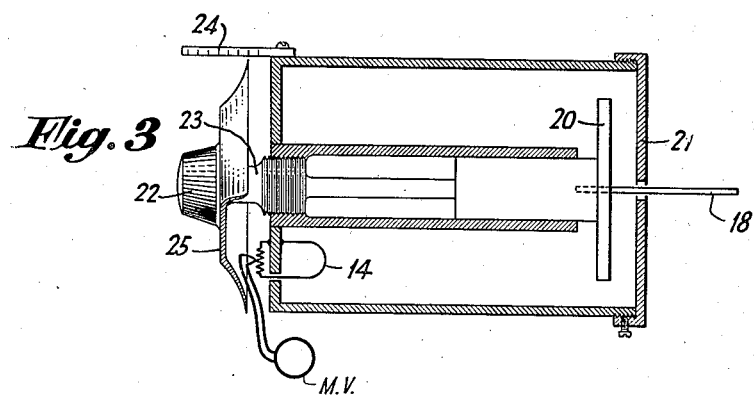
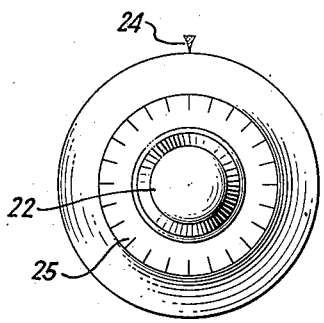
INVENTOR
PAUL D. ZOTTU
BY *H. S. Grover*
ATTORNEY Patented June 10, 1941

2,245,138

UNITED STATES PATENT OFFICE 2,245,138

WAVE METER

Paul D. Zottu, West Caldwell, N. J., assignor to Radio Corporation of America, a corporation of Delaware Application January 21, 1937, Serial No. 121,499

10 Claims. (Cl. 250—39)

This invention relates to wave-meters for ultra short radio waves.

In the measurement of ultra short waves, it has hitherto been customary to employ lecher wires for wave-meters. Such lecher wire wave-meters, however, suffer from several disadvantages, namely: (1) They are susceptible of excitation at more than one location along their length, for which reason they are not very reliable; (2) they do not tune very sharply due to their higher radio frequency losses; and (3) they are not portable, usually being strung up in the air between the sides of a wall, for which reason it is necessary to bring the source of oscillations to be measured to the wave-meter.

The present invention overcomes the foregoing disadvantages by providing a wave-meter which consists mainly in the use of a section of a concentric transmission line which is adapted to be excited at only one of its ends. Essentially the wave-meter of the invention consists of a plunger type section of concentric line wherein the operation of a plunger at one end is adapted to vary the effective electrical length of the inner and outer conductors of the concentric line at the other end. For indicating the condition of resonance of the wave-meter, there is provided a suitable detecting device, such as a thermocouple in conjunction with a milli-voltmeter, or a diode detector in conjunction with a current indicating instrument. For measuring the active length of the wave-meter, there is provided a section of a meter stick which is located within the concentric line section and connected to the plunger and movable therewith, the portion protruding externally of the concentric line and available for inspection being used to determine the length of the received waves when the indicating device registers a condition of resonance.

A better understanding of the invention will be had by referring to the accompanying drawing, wherein:

Fig. 1 illustrates the preferred wave-meter in accordance with the invention;

Fig. 2 illustrates a modification of the active end of the wave-meter which may be employed, if desired;

Fig. 3 illustrates, in cross section, an alternative form of wave-meter in accordance with the invention; and Fig. 3a illustrates an end view of the wave-meter of Fig. 3 facing the adjusting knob and graduated scale.

Referring to Fig. 1 in more detail, there is shown a section of concentric transmission line comprising an inner conductor 1 and an outer conductor 2, with an adjustable metallic disc 3 in contact with the outer surface of the inner conductor 1 and the inner surface of the outer conductor 2, and movable over their lengths in response to movement of plunger 4. The plunger 4 consists of a section of a meter stick 7, which is secured at one end to the disc 3, and at the other end to a pair of insulating rods 5. Stick 7 is guided in its travel in and out of the wave-meter concentric line section by a metal disc 6 which connects the inner and outer conductors 1, 2 together at the end nearest the plunger rods, the meter stick being located to one side of the inner conductor 1. The concentric line section 1, 2 is mounted on supports 8, 9 which are, in turn, fastened to a suitable wooden base 10. A star-shaped mica washer 11 is contained within the concentric line section near the support 9 for maintaining the inner and outer conductors in concentric relation to one another.

A suitable milli-voltmeter is connected by a pair of insulated leads 12 to a thermocouple 13, the heater element of which, in turn, is connected through a suitable wire loop 14 extending through the metallic disc 3 and terminating at the disc in the manner shown in the drawing, for indicating the condition of resonance. The intermediate portion of loop 14 which passes through the disc 3 is insulated therefrom in any suitable fashion. The entire thermocouple unit comprising the heater element 13, loop 14, and leads 12 is movable with the disc 3 as the plunger 4 and the meter stick 7 are moved over the length of the concentric line section.

It will be understood, of course, that if desired the thermocouple can be replaced by a suitable diode or crystal rectifier, not shown, which can also be mounted on the metallic plate 3 and movable therewith.

The concentric line section is open at the end mounted on support 9, and it is this end which is coupled to the source of oscillations it is desired to measure.

In the operation of the wave-meter, the concentric transmission line is placed so that the end 9 is adjacent the source of oscillations to be measured, whether it be an oscillation generator or an antenna circuit, and the plunger is moved in and out so that the indicating instrument, in this case the milli-voltmeter, indicates a maximum reading, at which time the active section of the wave-meter, that is, the section between the open end at support 9 and metallic disc 3, is tuned to resonance. In view of the fact that the inner and outer conductors of the active sections are conductively and directly connected together through the medium of metallic disc 3, it will be apparent that the loop 14 will thus be located at a current maximum point of the inner conductor 1. When the milli-voltmeter thus reads a maximum and indicates resonance of the wave meter, the meter stick will give a reading at the point nearest plate 6 which is available for inspection, which will indicate the length of the active section of the wave-meter. This indication of the meter stick may be calibrated directly to read the measured wavelengths. As an illustration, if the end of the conductor 1 which is adjacent the support 9 is open-ended, i. e., electrically unconnected at this end from the outer conductor 2, then the active length of the wave meter between this open end and the disc 3 at resonance will be actually or very close to one-quarter of the wave measured. In this case, the meter stick 7 may be so calibrated that it reads either this quarter wavelength or else, if the scale readings are graduated, to read four times the length of the active portion of the wave-meter, thus the meter would read directly the length of the wave of the source of oscillations to be measured. When the inner conductor 1 is open-ended, as in the case assumed above, it is preferred that this end of the wave-meter be placed adjacent the high potential points of the signal source whose wavelength it is desired to measure.

In practice, where the plunger type of wavemeter is employed, it is preferred that the end of the concentric line adjacent the support 9 be closed by short circuiting strap 15, which directly connects both inner and outer conductors together. Measurement is now made by placing the end of the wave-meter having the strap 15 adjacent and in such manner with respect to the signal source as to permit maximum inductive coupling between the signal source and the terminating strap 15. It will be evident that at resonance the loop 14 will again be at a point of maximum current on the inner conductor 1, but that the active portion of the wave-meter between strap 15 and metallic disc 3 will now be one-half wavelength instead of one-quarter wavelength, as in the case described above. The length of the meter stick which will now protrude from metallic disc 6 will be approximately equal to one-half the length of the wave of the signal source, or, if desired, as in the case mentioned before, the stick can be so calibrated as to read directly the wavelength of the signals to be measured.

If desired, the inner conductor 1 of the active section of the line may be capacitively coupled to the adjacent end of the outer conductor 2 by providing a large metallic disc 16 in the manner shown in Fig. 2 at the end supported by mounting 9, this metallic disc being spaced away from another disc 17 which closes the adjacent end of the outer conductor 2. Adjacent end 17 will then have an aperture located approximately in the center thereof for accommodating an exploring electrode 18 which extends through the aperture of the disc 17 and is conductively joined to the disc 16. An advantage of the arrangement of Fig. 2 lies in the fact that the capacitive termination between plates 16 and 17 enables considerable shortening of the active section of the wave-meter, while the provision of the exploring electrode 18 enables the wavemeter to be used in conjunction with energizing circuits of low external field. Such an arrangement as shown in Fig. 2 may find particular application to a circuit wherein the source of signals is contained in a shielded compartment, and wherein the exploring electrode 18 may be inserted in such compartment.

To insure an extremely low resistance contact between the inner and outer conductors at the disc 3, it is preferred to employ a piston ring, such as 19, made of some suitable resilient, good electrically conducting material, such as phosphor bronze.

Fig. 3 is an alternative arrangement of wavemeter wherein the plunger and meter stick are dispensed with and instead there are provided a knob 22 and threaded shaft 23 for varying the distance and hence capacity between plates 20 and 21. To indicate and define the position of the point of resonance there are also provided a scale 24 and a graduated dial 25. Scale 24 is fastened to the outer conductor of the section of concentric line near the adjusting knob, while the dial 25 is attached to the shaft and/or knob 23 and is revolvable therewith. A suitable detecting instrument, such as a thermocouple, with a loop and milli-voltmeter of the type shown in Fig. 1, is employed for direction of the point of resonance. Due to the fact that the wave-meter of Fig. 3 is a shortened section of line, only one point of resonance will occur along the length of the section, the distance of travel of capacity plate 20 with respect to plate 21 being only a small percentage of the total length of the section of concentric line. It therefore follows that the wave-meter of this figure must be calibrated before it can be used to determine lengths of waves. In other words, the meter of Fig. 3 is merely a resonance indicator, if not accompanied by a calibration chart.

Another advantage of the present arrangement is the wide, useful range of wavelengths that can be measured as compared with previous wave-meters. As an example, in one embodiment successfully used in practice, I was able to obtain a useful working wavelength range extending from two meters to something less than ten centimeters. If desired, the wavelength range can be extended from ten centimeters up to four meters and higher, by properly terminating the active end of the wave-meter by a suitable condenser, somewhat in the manner shown in Fig. 2.

Another advantage of this invention lies in the sharpness of tuning, inasmuch as the wavemeter is entirely free from stray fields and external disturbances. By means of the invention, I have been able to duplicate readings consistently with an accuracy of better than 0.2 of 1%. This degree of accuracy, it is to be distinctly understood, is not a limitation of the meter but rather a physical limitation of the operator, due to the particular type of plunger adjustment employed. Where a more accurate adjustment is employed, such as by the use of a vernier, which is also within the scope of the present invention, the degree of accuracy would be very much higher than the 0.2 of 1% mentioned above.

It should be noted, in using the wave-meter of the present invention to measure extremely small waves, that where the maximum active length of the section of concentric line is, let us say, equal to or greater than the length of the wave to be measured, that conditions of resonance will obtain at two or more points along the length of the active section, and thus the meter stick 7 can actually measure the distance of the wave between successive points corresponding to conditions of resonance. Where the inner conductor is electrically open with respect to the outer conductor, the first resonance point will occur when the active section is one-quarter of the wavelength from the open end, while the following resonance points will occur at intervals of one-half wavelength from the first point. Where, however, the inner conductor is conductively connected to the outer conductor by strap 15, the first resonance point occurs at a distance one-half wavelength from the strap while the following resonance points will also occur at intervals of one-half wavelength from the first point.

One advantage in using a wavemeter of the type described above where the maximum active length is greater than or equal to the length of the wave to be measured, is that the distance between successive resonance points on the wavemeter is equal to one-half wavelength within extremely accurate limits. Thus, the wavemeter requires no previous calibration.

If desired, measurements may be made by the wave-meter of Fig. 1 without the use of the self-contained internal detecting system consisting of thermocouple, associated pick-up loop 14, and external milli-voltmeter. If the thermocouple equipment is thus dispensed with, use is made of the power absorption abilities of the wave-meter at the condition of resonance to react on the source of oscillations to produce one or more of the following effects: (1) A sudden change in plate current of the source (if an electron discharge device oscillator is used for such source); (2) a sudden change in current in any one or more of the electrodes of the source if an electron discharge device oscillator is used as the source; (3) a slight change in frequency of the source of oscillations as the wave-meter passes through resonance (this may be detected by the beat note principle of beating the frequency of the source to be measured with another oscillator of substantially constant frequency, and detecting the sum or the difference). In effect we are thus substituting for the internal detecting system of thermocouple and loop, an external detector intimately associated with the source. Of course, in this last case, where the internal detecting apparatus is dispensed with, the plunger and meter stick are still employed to indicate the length of the wave to be measured.

It should be understood that the invention is not limited to the precise embodiments described and illustrated in the drawing, since various modifications may be made without departing from the spirit and scope of the invention, the essential requirement only being that there be employed a section of concentric transmission line.

What is claimed is:

1. A wave-meter comprising a section of concentric line whose conductors are coupled together through a path of low impedance at a point in their lengths and which are unconnected at the end adapted to receive the waves to be measured, a movable disc for varying the position of said coupling point, means for indicating the position of said point with respect to the unconnected end of said line, and a detector secured to said disc and movable therewith for indicating the condition of resonance of said line.

2. A wave-meter comprising a section of concentric line having an inner and an outer conductor, a short-circuiting disc within said line for connecting said conductors together, means for varying the position of said disc and for indicating the position of said disc with respect to one end of said line, a loop of wire contained within the outer conductor of said line and coupled to the inner conductor at a location of substantially maximum current flow through said inner conductor, and a detecting instrument connected to said loop of wire.

3. A wave-meter comprising a section of concentric line having an inner and an outer conductor, a short-circuiting disc within said line for connecting said conductors together, means for varying the position of said disc and for indicating the position of said disc with respect to one end of said line, a loop of wire contained within the outer conductor of said line and coupled to the inner conductor at a location of substantially maximum current flow through said inner conductor, a thermocouple located within the outer conductor and connected to said loop, and an indicating instrument located externally of said line and connected to said thermocouple.

4. A wave-meter comprising a section of concentric line having an inner and an outer conductor, a short-circuiting disc within said line for connecting said conductors together, means for varying the position of said disc and for indicating the position of said disc with respect to one end of said line, a loop of wire contained within the outer conductor of said line and coupled to the inner conductor at a location of substantially maximum current flow through said inner conductor, said loop being connected to said disc and movable therewith, and a detecting instrument connected to said loop of wire.

5. A wave-meter comprising a section of concentric line whose conductors are coupled together through a path of low impedance at a point in their lengths and which are unconnected at the end adapted to receive the waves to be measured, means for varying the position of said coupling point and for indicating the position of said point with respect to the unconnected end of said line, said means including a section of a movable meter stick, and an electrical detector linked to said meter stick and movable therewith for indicating the condition of resonance of said line.

6. A wave-meter comprising a section of concentric line whose conductors are coupled together through a path of low impedance at a point in their lengths and which conductors are connected together by means of a strap at the end adapted to receive the waves to be measured, means for varying the position of said coupling point and for indicating the position of said point with respect to the end of said line to which said strap is connected, and a detector for indicating the condition of resonance of said line.

7. A wave-meter comprising a section of concentric line having an inner and an outer conductor, a short-circuiting metallic disc within said line for connecting said conductors together, a plunger for varying the position of said disc, said plunger including a section of a meter stick for indicating the position of said disc with respect to one end of said line, a loop of wire contained within the outer conductor and coupled to the inner conductor at a point of substantially maximum current flow through said inner conductor and being movable with said disc, said loop being on one side of said disc, a wave detecting instrument also within said outer conductor and located on the other side of said disc than said loop but coupled to said loop.

8. A wave-meter comprising a section of concentric transmission line having inner and outer conductors conductively coupled together at one end and capacitively coupled together at their other end, an exploring electrode coupled to said inner conductor at the capacitively coupled end, said exploring electrode being effectively insulated from said outer conductor, a movable disc for varying the effective length of said inner and outer conductors and means for indicating said variation, and a detecting instrument secured to and movable with said disc for indicating the condition of resonance of said line.

9. A portable wave-meter comprising a tuned circuit in the form of a section of concentric line having an outer conductor of fixed length and an inner conductor, there being an air space between said inner and outer conductors, said inner and outer conductors being mechanically coupled together at one of their adjacent ends, the other end of said outer conductor being open to enable reception of electromagnetic waves, means for varying the effective length of said inner conductor for tuning said line to the frequency of the wave to be measured, a scale at the mechanically coupled ends of said conductors for indicating the length of the received waves, and a thermo-couple including a loop of wire physically located between said inner and outer conductors at a point of substantially maximum current flow for registering a condition of resonance in said line.

10. A portable wave-meter comprising a tuned circuit in the form of a section of concentric line having an outer conductor of fixed length and an inner conductor, there being an air space between said inner and outer conductors, said inner and outer conductors being mechanically coupled together at one of their adjacent ends, the other end of said outer conductor being open, means for varying the effective length of said inner conductor for tuning said line to the frequency of the wave to be measured, a scale at the mechanically coupled ends of said conductors for indicating the length of the received waves, and a detector including a loop of wire physically located between said inner and outer conductors at a point of substantially maximum current flow for registering a condition of resonance in said line.

PAUL D. ZOTTU.